June 5, 1962 N. V. ROSS 3,038,055
INDUCTORS FOR SEAM WELDING
Filed March 31, 1958 2 Sheets-Sheet 1

INVENTOR.
Nicholas V. Ross
BY
ATTORNEY

June 5, 1962 N. V. ROSS 3,038,055
INDUCTORS FOR SEAM WELDING
Filed March 31, 1958 2 Sheets-Sheet 2

INVENTOR.
Nicholas V. Ross
BY Slough & Slough
ATTORNEY

United States Patent Office 3,038,055
Patented June 5, 1962

3,038,055
INDUCTORS FOR SEAM WELDING
Nicholas V. Ross, Youngstown, Ohio, assignor to Ajax Magnethermic Corporation, a corporation of Ohio
Filed Mar. 31, 1958, Ser. No. 725,026
11 Claims. (Cl. 219—8.5)

My invention relates to induction heating and more particularly to electric induction heating of the edges of longitudinally split tubing of generally C-shaped cross-section, commonly referred to as skelp, for the production of seam welded tubing.

Previous methods of inductively heating the edges of skelp with which I am familiar comprise various devices for placing a main inductor adjacent said edges with the return inductor leads spaced circumferentially away therefrom. These constructions have several disadvantages which the present invention overcomes. In the first place, the tendency in the past has been to effect surface of "skin" heating only, the remainder of the metal thickness being heated by conduction. The surface portion is thereby brought to fusion temperature before the inner area of the metal resulting in a non-uniform weld. Also in former devices, more area is heated than is either necessary or desirable since the edge should be heated only a minimum circumferential distance from the edge surface to obtain the best weld. Too much circumferential heating causes excessive upset of the fused metal. To obtain the best butt weld, it is necessary to rapidly heat to fusion temperature only the edges of the confronting surfaces of the skelp material along the surfaces to be joined. It is also necessary to heat uniformly in a radial direction or transversely through the skelp edges in order to uniformly and inductively heat throughout such edges regardless of the thickness of the material. Older devices of this type also fail to concentrate the magnetic flux in the area to be heated and thus cause considerable flux leakage. In the present construction, the above mentioned undesirable features, as well as many others, have been overcome.

It is an object of my invention to provide an improved means of heating the opposed edges of skelp to welding temperature.

Another object of my invention is to provide improved means for heating rapidly a thin edge of material along the skelp surfaces that are to be welded or joined.

A still further object of my invention is to provide improved means of electric induction heating of the opposed edge surfaces of the skelp to heat the same more uniformly in a radial direction than has heretofore been possible with thick sections.

A still further object of my invention is to provide improved means for electric induction heating of the opposed edges of the skelp with high efficiency and little magnetic flux leakage.

Still a further object of my invention is to provide improved electric induction heating means for heating the opposed edges of the skelp whereby the induction uniting of the edges of the skelp is achieved with a minimum upsetting of material of the edges during joining or welding operation.

A further object of my invention is to achieve improved means for electric induction heating of the opposed edges of the skelp whereby said edges are heated a minimum circumferential distance away from said edges.

Still another object of my invention is to provide improved electric induction heating means wherein good coupling can be obtained with the pipe at all times, even when the pipe temperature exceeds the Curie point and becomes nonmagnetic.

Yet another object of my invention is to provide a device of the above type wherein the power capacity of the inductor is greatly increased over prior art devices with which I am familiar.

Still another object of my invention is to provide means for electric induction heating wherein adverse effects due to variations in distance between the inductor and the skelp or relative changes in position of the skelp with regard to the inductor are minimized.

Another object of my invention is to provide an improved method for inductively heating the opposed edges of skelp for welding the same.

Other objects of my invention and the invention itself will become more readily apparent by reference to the attached figures of drawing and the appended description. In the drawings.

Figure 5:
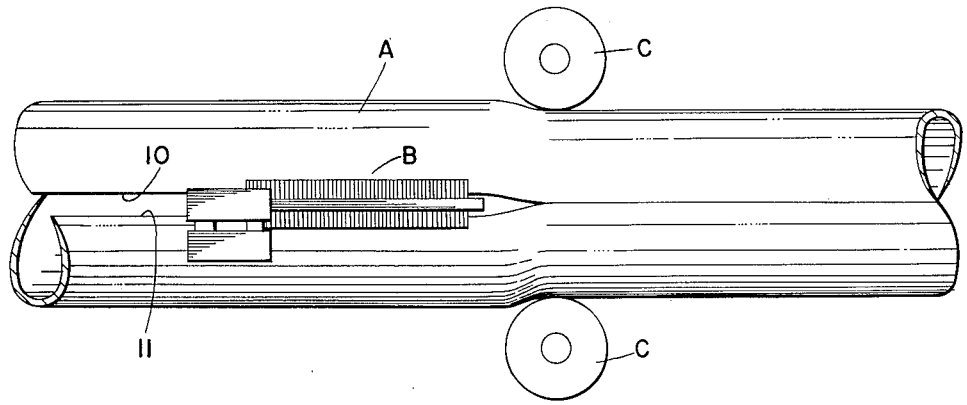
Figure 6:
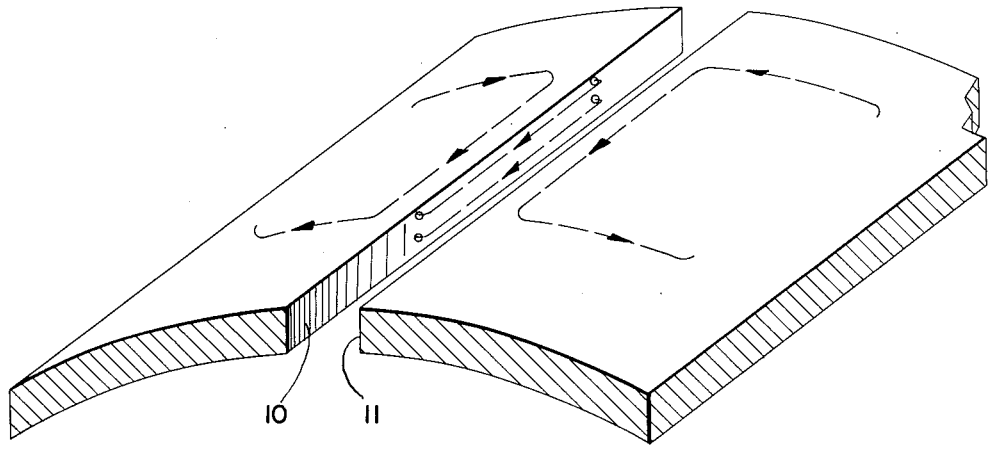

FIG. 5 is a top view shown schematically of the induction means of my invention, the skelp, and the seam welded tubing and showing rollers commonly used to press the edges together after the induction heating thereof; and FIG. 6 is a fragmentary perspective view of the edges of the skelp during induction heating and showing the current paths induced in said skelp during the induction heating thereof.

Referring now more particularly to the drawings in all of which like parts are designated by like reference characters, FIG. 5 shows a partially formed C-shaped tube or skelp A being moved through an electric induction device B and thence through a pair of pressure rolls C. The skelp A shown is illustrative only and may be circular, elliptical or polygonal in cross-sectional shape and has a pair of spaced opposed edges 10 and 11. The driving and forming rolls C as illustrated comprise portions of a much more complex machine and are shown schematically. These may take any desired conventional form. The primary function of the rolls C is to bring the edges 10 and 11 into pressure engagement after the edges have been heated by passing through the inductor B.

Figure 1:
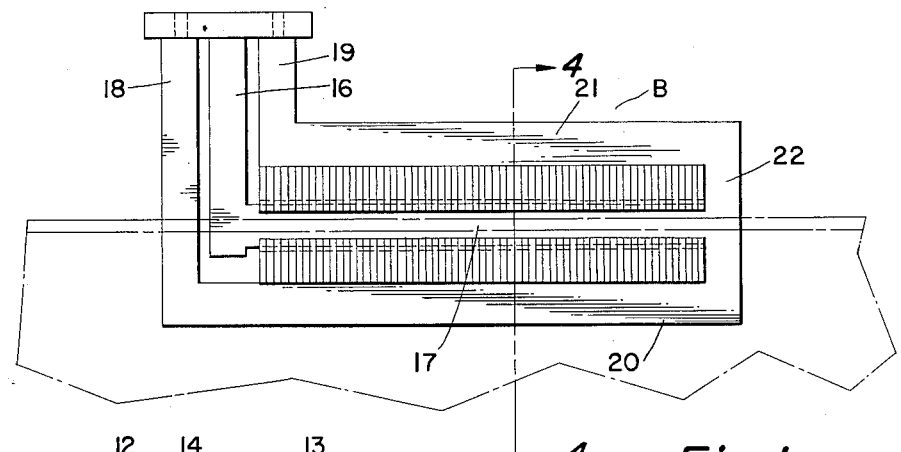
FIG. 1 is a side plan view of the electric induction heating means of my invention.
Figure 2:
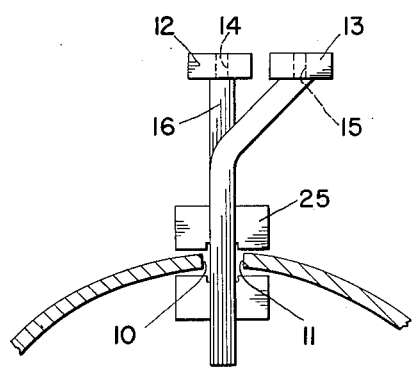
FIG. 2 is a front plan view of the electric induction device illustrated in FIG. 1, the opposed edges of the skelp being heated shown in fragmentary section.
Figure 3:
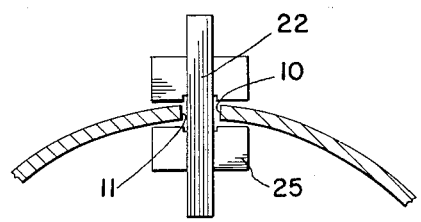
FIG. 3 is a rear end view of the induction means of FIGS. 1 and 2, said view being opposite to that of FIG. 2.
Figure 4:
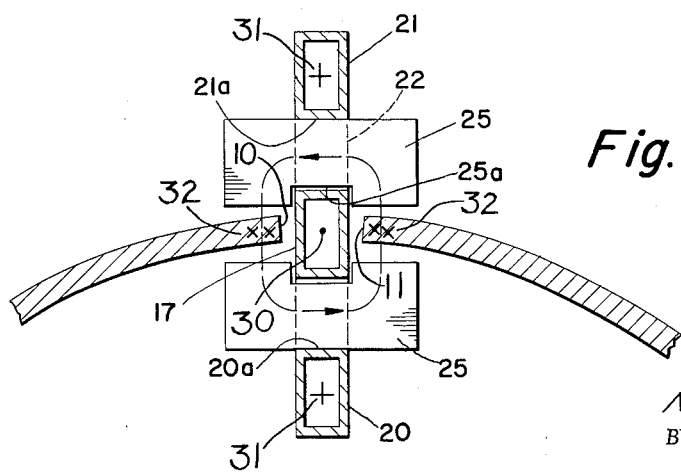
FIG. 4 is a view taken on the line 4—4 of FIG. 1.

The electric induction means B is shown in greater detail in FIGS. 1, 2, 3 and 4. Referring to said FIGS. 1 through 4, the induction means B comprises a pair of terminal blocks 12 and 13 which are adapted to be mounted on the terminal board of a suitable transformer by stud bolts (not shown) extending through stud holes 14 and 15. Extending downwardly from the terminal block 12 is a main inductor 16 having a portion thereof disposed at right angles to said downwardly extending portion as indicated at 17, said portion extending in a direction parallel to the axis of the skelp and being interposed between the opposed edges 10 and 11. Extending downwardly from the terminal block 13 is a pair of return inductor leads 18 and 19 having portions thereof, 20 and 21, adapted to extend in a direction horizontal and generally parallel to the main inductor 17 and the opposed edges of the skelp, and said return inductor leads are connected to the main inductor by an electrically conducting member 22 which integrally secures the same together. As best shown in FIG. 4, the inductor 21 is disposed above the main inductor 17 and above the skelp or tube to be heated, and the inductor 20 is disposed below the main inductor 17 and within the area enclosed by the partially formed skelp whose opposite edges are adapted to be heated to form seam welded tubing as shown in FIG. 5. The return inductors 20 and 21 are spaced from said main inductor 17 which is disposed intermediate and spaced from the opposed edges of the skelp 10 and 11.

The main inductor 17, as best shown in FIG. 4, is the conductor located within the area where it is desirable to have the maximum amount of heating. It will be noted that said main inductor is elongated and extends for a considerable extent longitudinally within the opposite edges 10 and 11. Thus heating along the edges for whatever desired distance may be accommodated by the length of said main conductor. It is also to be noted that the current paths induced in the opposite edges of said skelp by the positioning and formation of my improved electric induction heating means is such that the edges are inductively heated transversely and vertically over the area which is to be subsequently joined by the welding operation.

Ordinarily, preferably high frequency electric currents are circulated through the main inductor 16—17 from the terminal block 12, and return through the secondary conductors or return leads for said conductor 18—20 and 19—21 through the terminal block 13, said secondary conductors each carrying half of the return current. The direction of the magnetic field for any one instance is indicated by the arrows in FIG. 4 thereby inducing current paths in the opposed edges of the skelp or pipe as best indicated in FIG. 6.

Magnetically permeable, longitudinally stacked iron laminations 25, generally rectangular in form, are suitably secured edgewise to inwardly directed surfaces 20a and 21a of the return inductors 20 and 21 respectively. The inwardly directed edges of said laminations are provided with notches 25a whereby said laminations are spaced away from and out of contact with the main inductor 17. In some applications, the notches 25a may be omitted for simplicity of construction or for other practical reasons.

The laminations carry the magnetic flux indicated by arrows in FIG. 4 that surrounds the main inductor and threads the material that is to be heated, and induces the current paths indicated in FIG. 6 through the opposed edges of the skelp. In FIG. 4 I show the current in the main inductor 17 as indicated by the dot 30, said current proceeding away from the viewer and returning through the return inductors 20 and 21 as indicated by the plus signs 31. The X's shown at 32 represent the currents which are induced longitudinally in the opposed edges 10 and 11 of the skelp A at diametrically opposite points in the magnetic field and correspond to the arrows shown in FIG. 6.

It has been found that with this type of electric induction heating means there can be little magnetic flux leakage due to the particular inductor, iron lamination, and skelp configurations, that the induction heating means will heat material of varying thickness with a single inductor, and that it will heat uniformly across the opposing edges of the skelp as illustrated in FIG. 6.

The oppositely disposed laminations are vertically interspaced as best shown in FIG. 4 which affords a path for the skelp edges to travel through on either side of said main inductor 17. The opposite edges 10 and 11 of the skelp do not come in contact with either the laminations 25 or the main inductor 17 during such travel. As stated, the conductor 17 performs the principal heating action, and the current flow is concentrated in the area about the edges of the skelp which are to be subsequently joined by the welding process.

By placing the main inductor 17 between the edges 10 and 11 with one of the return inductor portions above and one below said edges, the magnetic flux path as shown in FIG. 4 is set up and as described is directed only through the edges to be heated. Since the flux field diminishes outwardly from the main inductor 17, the concentration of flux density will be at the edges of the material, as shown in FIG. 6, and will eliminate any undesirable degree of circumferential heating. The extent of the heating of the edges is, therefore, kept to the desired minimum for welding of this type. Due to the fact that the edge portions to be heated are of relatively small extent and the magnetic flux path is concentrated at that point, heating is extremely rapid and uniform in the desired area.

Although I have described my invention in connection with a preferred embodiment thereof, I am aware that numerous and extensive departures may be made therein without, however, departing from the spirit of my invention and the scope of the appended claims.

Having thus described my invention, I claim:

1. The method of heating to welding temperature the spaced edges of an elongated workpiece comprising the introducing of said edges into circumferentially disposed areas of a concentrated magnetic field around a main current-carrying body, whereby the magnetic forces are threaded through said edges, the return current of said main body being equally divided above and below said edges.

2. The method of heating to welding temperature the opposed edges of an elongated workpiece comprising inducing a main field of magnetic flux and providing magnetically permeable means positioned at diametrically opposite points in said field to confine said field and provide areas of concentrated flux between said permeable means, and the projecting of said edges into said areas of concentrated flux to induce current to flow therethrough.

3. An electric induction device for heating to welding temperature the opposed edges of skelp comprising a main inductor and a pair of return inductor leads, said main inductor interposed between said opposed edges, one of said return inductor leads being outside of said skelp and the other of said return inductor leads being inside of said skelp.

4. An electric induction device for heating to welding temperature the opposed edges of skelp comprising a main inductor and a pair of return inductors, all of said inductors being parallel and lying in a single plane, said main inductor being interposed between said opposed edges of skelp with one of said return inductors being positioned outside of said skelp and the other of said return inductors being positioned inside of said skelp.

5. An electric induction device for heating to welding temperature the opposed edges of skelp comprising a main inductor and a pair of return inductors, said main inductor being parallel with and interposed between said opposed edges, one of said return inductors being parallel with and spaced above said main inductor outside said skelp, the other of said return inductors being parallel with and spaced below said main inductor inside said skelp, means for electrically connecting said main inductor and said return inductors at similarly directed ends thereof.

6. An electric induction device for heating to welding temperature the opposed edges of skelp comprising a main inductor and a pair of return inductors, said main inductor being parallel with and interposed between said opposed edges, one of said return inductors being parallel with and spaced above said main inductor outside said skelp, the other of said return inductors being parallel with and spaced below said main inductor inside said skelp, each of said return inductors being provided with stacks of magnetic laminations mounted upon the inwardly directed surfaces of said return inductors, said laminations being spaced away from said main inductor, said main inductor and said return inductors being electrically connected whereby current applied to said main inductor is equally divided to return through said return inductors.

7. An electric induction device adapted to uniformly heat opposed, spaced edges of an elongated workpiece, said device comprising a main inductor of lesser width than the spacing of said opposed edges and interposed therebetween, a pair of return inductors spaced from said main inductor and positioned on either side of said workpiece, said main inductor and said return inductors defining a plane substantially at right angles to said workpiece, stacked, magnetic laminations secured to the inwardly directed surfaces of said return inductors adjacent and spaced from said main inductor, means for electrically connecting said main inductor with said return inductors at one end of said induction device and means for connecting said main inductor and said return inductors to a suitable electric power source.

8. An electric induction device adapted to uniformly heat opposed, spaced edges of an elongated workpiece, said device comprising a main inductor and a pair of return inductors integrally united at one end thereof, all of said inductors being interspaced, parallel, and defining a single plane, said main inductor being interposed between said pair of return inductors, each of said return inductors being provided with stacked, magnetically permeable laminations secured to the inwardly directed surfaces thereof adjacent said main inductor, said laminations being slightly spaced from said main inductor, said induction device adapted to be associated with said workpiece whereby said main inductor is interposed between said spaced edges with one of said return inductors being positioned on one side of said workpiece and the other of said return inductors being positioned on the opposite side of said workpiece.

9. An electric induction device adapted to uniformly heat opposed, interspaced edges of an elongated workpiece, said device comprising a main inductor and a pair of return inductors integrally united at one end thereof, all of said inductors being interspaced, parallel, and defining a single plane, said main inductor being interposed between said pair of return inductors, each of said return inductors being provided with stacked, magnetically permeable laminations secured to the inwardly directed surfaces thereof adjacent said main inductor, said laminations having laterally projecting portions extending beyond said inductors, said laminations being slightly spaced from said main inductor, said induction device adapted to be associated with said workpiece whereby said main inductor is interposed between said spaced edges with one of said return inductors being positioned on one side of said workpiece and the other of said return inductors being positioned on the opposite side of said workpiece, said edges being interposed between said laterally projecting portions of said laminations.

10. The method of heating an edge of an elongated workpiece comprising the introducing of said edge into a concentrated magnetic field disposed circumferentially around a main current-carrying body, whereby the magnetic forces are threaded through said edge, the return current of said main body being equally divided above and below said edge.

11. An electric induction device for heating an edge of an elongated workpiece comprising a main inductor having a pair of return inductor leads, said main inductor being spaced laterally of said edge, one of said return inductor leads being above and in spaced relation to said edge and the other of said return inductor leads being spaced below and in spaced relation to said edge.

References Cited in the file of this patent

UNITED STATES PATENTS

| | | |
|---|---|---|
| 2,024,906 | Bennett | Dec. 17, 1935 |
| 2,066,668 | Bennett | Jan. 5, 1937 |
| 2,209,637 | Sessions | July 30, 1940 |
| 2,460,687 | Fuchs | Feb. 1, 1949 |
| 2,483,973 | Goettings | Oct. 4, 1949 |
| 2,582,955 | Body | Jan. 22, 1952 |
| 2,763,756 | Rudd et al. | Sept. 18, 1956 |
| 2,964,607 | Frumkin | Dec. 13, 1960 |